(12) United States Patent
Dalsgaard

(10) Patent No.: US 9,462,564 B2
(45) Date of Patent: Oct. 4, 2016

(54) APPARATUS, METHOD AND COMPUTER PROGRAM PRODUCT PROVIDING UPLINK SYNCHRONIZATION THROUGH USE OF DEDICATED UPLINK RESOURCE ASSIGNMENT

(75) Inventor: Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 2542 days.

(21) Appl. No.: 11/799,200

(22) Filed: May 1, 2007

(65) Prior Publication Data
US 2007/0254656 A1 Nov. 1, 2007

Related U.S. Application Data

(60) Provisional application No. 60/796,767, filed on May 1, 2006.

(51) Int. Cl.
*H04B 7/212* (2006.01)
*H04W 56/00* (2009.01)
*H04B 7/26* (2006.01)
*H04W 72/04* (2009.01)

(52) U.S. Cl.
CPC ....... *H04W 56/0045* (2013.01); *H04B 7/2681* (2013.01); *H04W 72/04* (2013.01)

(58) Field of Classification Search
CPC ........... H04W 56/0045; H04W 72/04; H04W 74/0891; H04B 7/2675; H04B 7/2678; H04B 7/2681
USPC ........ 370/324, 250, 498, 350, 503, 508–510
See application file for complete search history.

(56) References Cited

U.S. PATENT DOCUMENTS 5,822,311 A * 10/1998 Hassan et al. ................ 370/322
5,867,478 A * 2/1999 Baum et al. .................. 370/203

(Continued)

FOREIGN PATENT DOCUMENTS

| EP | 2487 983 A2 | 8/2012 |
|---|---|---|
| JP | 2001/505018 A | 4/2001 |

(Continued)

OTHER PUBLICATIONS

Nokia: R2-061083, "Text Proposal for the Scheduler in 25.813", eGPP TSG-RAN WG2 Meeting #52, Athens, Greece, Mar. 27-31, 2006, retrieved from: http://www.3gpp.org/ftp/tsg_ran/WG2_RL2/TSGR2_52/Documents/, section 2.

(Continued)

*Primary Examiner* — Wayne Cai
(74) *Attorney, Agent, or Firm* — Harrington & Smith

(57) ABSTRACT

An assignment of an uplink resource on which to send an uplink synchronization signal is transmitted to a user equipment. The user equipment sends on the uplink resource an uplink synchronization signal. From the uplink synchronization signal is determined a timing advance for the user equipment. Various indications are used to indicate to the user equipment that the assignment of uplink resources is for the purpose of sending its synchronization signal, such as expiration of its timing advance timer, a field in the allocation table that assigns the uplink resources, or explicit signaling from the network. Methods, devices, and computer program products are detailed for both network and user equipment embodiments.

36 Claims, 5 Drawing Sheets

(56) References Cited

U.S. PATENT DOCUMENTS

| | | | |
|---|---|---|---|
| 8,078,170 B2 | 12/2011 | Phan et al. | 455/436 |
| 2003/0045288 A1* | 3/2003 | Luschi et al. | 455/434 |
| 2005/0138531 A1* | 6/2005 | Kim | 714/774 |
| 2005/0286465 A1 | 12/2005 | Zhuang | 370/329 |
| 2007/0133458 A1* | 6/2007 | Chandra et al. | 370/329 |
| 2007/0189205 A1* | 8/2007 | Terry et al. | 370/328 |
| 2007/0259675 A1* | 11/2007 | Worrall | H04W 68/00 455/458 |
| 2007/0265016 A1 | 11/2007 | Kahtava et al. | 455/452.2 |
| 2008/0051098 A1* | 2/2008 | Rao | H04W 74/0866 455/452.1 |

FOREIGN PATENT DOCUMENTS

| | | |
|---|---|---|
| JP | 2005/006293 A | 1/2005 |
| WO | WO-2007/091150 A2 | 8/2007 |

OTHER PUBLICATIONS

Ericsson: R2-060866, "Random Access Procedures for LTE", Joint RAN1/RAN2 meeting on LTE, Athens, Greece, Mar. 27-31, 2006, retrieved from: http://www.3gpp.org/ftp/tsg_ran/WG2_RL2/TSGR2_52/Documents/, the whole document.

IPwireless: R2-060034, "RRC connection establishment procedure for E-UTRA", 3GPP TSG RAN WG2 #50, Sophia Antipolis, France, Jan. 9-13, 2006, retrieved from: http://www.3gpp.org/ftp/tsg_ran/WG2_RL2/TSGR2_50/Documents/, the whole document.

Nokia: R2-071741, "Uplink Synchronisation Recovery", 3GPP TSG-RAN WG2 Meeting #58, Kobe, Japan, May 7-11, 2007, retrieved from: http://www.3gpp.org/ftp/tsg_ran/WG2_RL2/TSGR2_58/Documents.

"Technical Specification Group Radio Access Network; Evolved Universal Terrestrail Radio Access (E-UTRA) and Evolved Universal Terrestrial Radio Access Network (E-UTRAN); Overall description; Staga 2 (Release 8)", 3GPP TS 36.300 V1.0.0, 2007, 82 pgs.

"Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3 GPP TR 25.813 V0.8.3, 2006, 34 pgs.

"DRX and DTX in LTEActive", TSG-RAN WG2 Meeting #52, Athens, Greece, Mar. 2006, pp. 1-5.

"Text Proposal for the scheduler in 25.813", Nokia, 3GPP TSG-RAN WG2 Meeting #52, R2-061083, Mar. 2006, 2 pgs.

"DRX and DTX in LTEActive", Ericsson, TSG-RAN WG2 Meeting #52, R2-060967, Mar. 2006, 5 pgs.

* cited by examiner

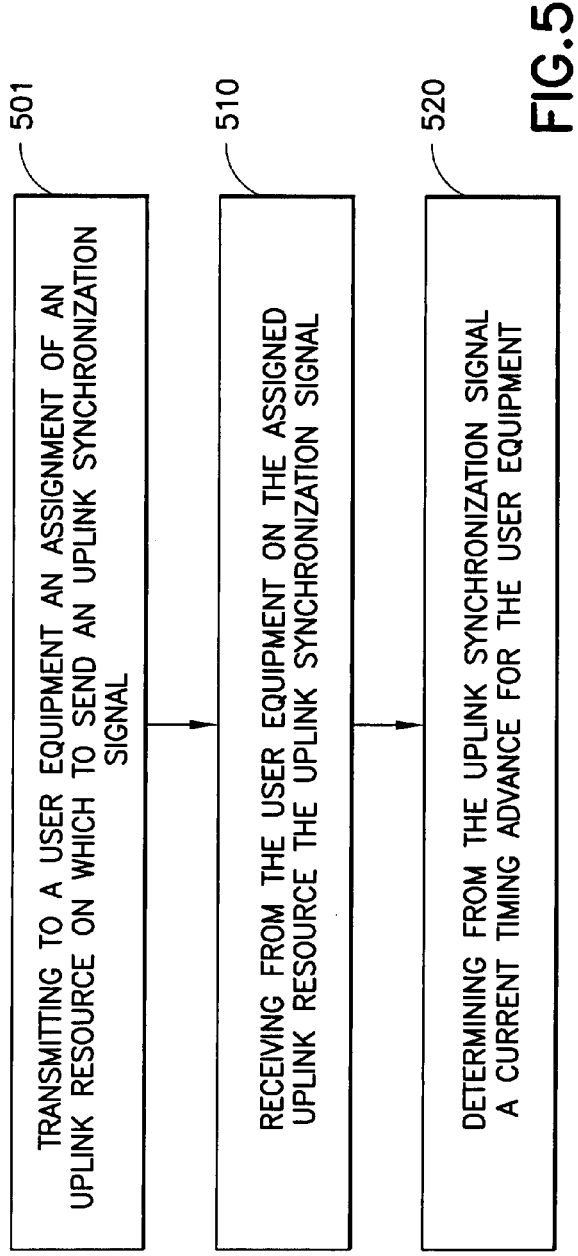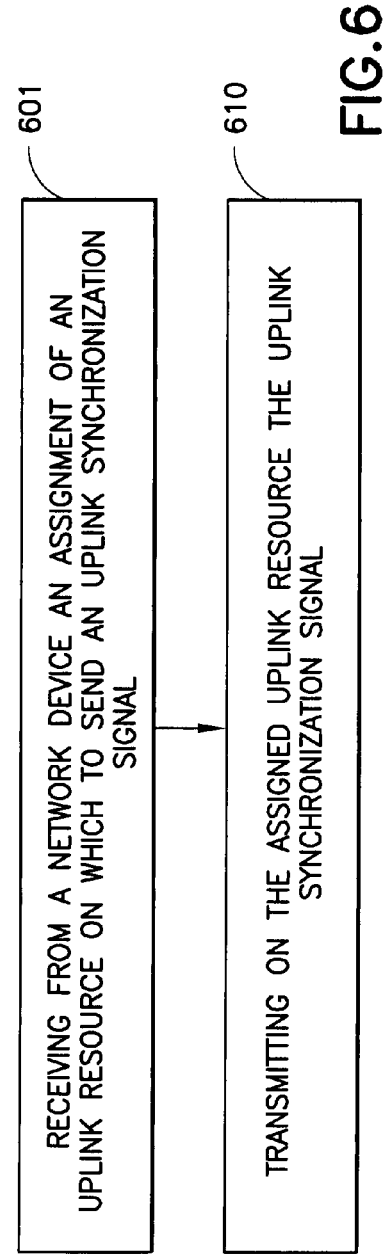

APPARATUS, METHOD AND COMPUTER PROGRAM PRODUCT PROVIDING UPLINK SYNCHRONIZATION THROUGH USE OF DEDICATED UPLINK RESOURCE ASSIGNMENT

REFERENCE TO RELATED APPLICATION

This patent application claims priority under 35 U.S.C. §119(e) from U.S. Provisional Patent Application No. 60/796,767, filed on May 1, 2006, and hereby incorporated by reference in its entirety.

TECHNICAL FIELD

The exemplary and non-limiting embodiments of this invention relate generally to wireless communications systems, methods, computer program products and devices and, more specifically, relate to techniques for achieving uplink temporal synchronization of user equipment.

BACKGROUND

The following abbreviations are herewith defined:

| | |
|---|---|
| 3GPP | third generation partnership project |
| AT | allocation table (also called physical downlink shared control channel PDCCH) |
| C-RNTI | cell radio network temporary identifier |
| DL | downlink (node B to UE) |
| DRX | discontinuous reception |
| GPRS | general packet radio service |
| GSM | global system for mobile communication |
| HO | hand over |
| IMS | instant messaging service |
| LTE | long term evolution |
| MAC | medium access control |
| Node B | base station |
| PTCCH | packet timing advance control channel |
| RACH | random access channel |
| RLID | radio link identifier |
| RNC | radio network control |
| RRC | radio resource control |
| SCH | shared channel |
| TA | timing advance |
| TBF | temporary block flow |
| UE | user equipment |
| UL | uplink (UE to node B) |
| UMTS | universal mobile telecommunications system |
| UTRAN | UMTS terrestrial radio access network |
| E-UTRAN | evolved UTRAN, also referred to as UTRAN-LTE and as 3.9G |
| VoIP | voice over internet protocol |

UTRAN-LTE is defined as a packet-based transmission system only. This implies that there will not be a so-called dedicated connection mode (or circuit switched mode) as exists in some currently deployed systems.

As currently defined the uplink air interface resources are divided between an UL-SCH and a contention based RACH. A Node-B may provide an allocation on the UL-SCH if the UE can be identified (such as with RLID/C-RNTI) and if the TA of the UE has been so recently controlled by the Node-B such that it can be considered to be valid. If the UE has no valid TA it is not allowed to transmit on the UL-SCH. The random access procedure may be used by the UE for initial network access, for TA adjustment, for transfer from LTE-IDLE to LTE-ACTIVE state, for uplink resource requests and during HO. One of a synchronous or non-synchronous random access procedure is used, depending on the validity of UE's TA.

Further reference with regard to the RACH channel can be made to, for example, Annex B of 3GPP TR 25.813, V0.8.3, 3rd Generation Partnership Project, Technical Specification Group Radio Access Network; Evolved Universal Terrestrial Radio Access (E-UTRA) and Evolved Universal Terrestrial Radio Access Network (E-UTRAN), and Radio interface protocol aspects (Release 7).

One proposal for UTRAN-LTE is that the UE will receive the UL-SCH resource allocations from the network through an AT, where the UE would receive the AT at certain instants in time determined at least in part by the current DRX period of the UE (which may be defined by the network).

It should be noted that in the general case resource(s) are assigned to the UE by the network through the use of DL control signaling. The exact format and content of this control signaling is not particularly germane to an understanding of the invention, and in fact may be subject to revision.

However, if the currently used DRX period of the UE is long (e.g., seconds) the TA used by the UE before the DRX period may no longer be valid for use in transmission in the UL-SCH. If the UE no longer has a valid TA it is not allowed to transmit in the UL-SCH before the UE has received a new TA value from the network.

More generally, if the time from the last update of the TA is long, however the TA may be updated, then the TA may not be valid. The use of DRX periods to ascertain the potential validity or invalidity of the current TA of the UE is but one non-limiting example.

It has been proposed that the procedure for achieving a valid TA (when no valid TA is available) includes transmission by the UE on the non-synchronized RACH channel. However, this approach, which utilizes a contention based resource (where the possibility of collisions, backoffs and re-transmissions may occur), may introduce an undesirable and unpredictable delay.

Another issue relates to a requirement in 3.9G that the UE in the Active state shall always be UL synchronized. Such a requirement would in practice mean that there would be a need for constant DL/UL transmissions in order to allow the network to maintain the UL synchronization (TA) of the UE up-to-date, and could require scheduled DL/UL transmission for no other reason than keeping the UE TA current. As can be appreciated, this approach is not efficient in terms of UE power consumption and bandwidth utilization.

Yet another issue relates to whether it is really necessary for all connection types and services to maintain UL synchronization at all times. One justification for maintaining UE UL synchronization is that there is a need for fast connection setup time (short delay), and another is to maintain a constant regular UL/DL data flow with short intervals (e.g., VoIP). In other situations, however, such as normal WEB browsing or email download, the setup time may not be as important and the data may be transmitted in a bursty (aperiodic) manner.

It is noted that in the currently deployed GSM HO procedure, when the UE receives a HO command to a new cell and does not have a valid TA for the new cell, the UE is not allowed to transmit a normal UL burst in the new cell. Instead, the UE must transmit a shorter duration burst that leaves a large part of the time slot as a guard time or guard band around the burst. The network measures the propagation delay from the received short burst and sends an appropriate TA value to the UE. The UE can then start to use the newly assigned TA value when transmitting a normal UL burst.

The use of the PTCCH in the GPRS is another already deployed procedure for assuring that the UE has UL synchronization. However, the use of this procedure is only valid when the UE has an active TBF, which means that there is an already established UL/DL connection between the network and the UE.

SUMMARY

In an exemplary embodiment of the invention there is a method which includes transmitting to a user equipment an assignment of an uplink resource on which to send an uplink synchronization signal, receiving from the user equipment on the uplink resource the uplink synchronization signal, and determining from the uplink synchronization signal a timing advance for the user equipment.

In an exemplary embodiment of the invention there is a method which includes receiving from a network device an assignment of an uplink resource on which to send an uplink synchronization signal, and transmitting on the assigned uplink resource the uplink synchronization signal.

In yet another exemplary embodiment of the invention there is a computer program product embodied on a memory and executable by a processor to perform operations, including transmitting to a user equipment an assignment of an uplink resource on which to send an uplink synchronization signal, receiving from the user equipment on the assigned uplink resource the uplink synchronization signal, and determining from the uplink synchronization signal a timing advance for the user equipment.

In yet another exemplary embodiment of the invention there is a network element, which includes a transmitter adapted to transmit to a user equipment an assignment of an uplink resource on which to send an uplink synchronization signal, a receiver adapted to receive from the user equipment on the assigned uplink resource the uplink synchronization signal, and a processor adapted to determine from the uplink synchronization signal a timing advance for the user equipment.

In still another exemplary embodiment of the invention there is a user equipment, which includes a receiver adapted to receive from a network device an assignment of an uplink resource on which to send an uplink synchronization signal, a processor coupled to a memory and adapted to determine the uplink synchronization signal, and a transmitter adapted to transmit on the uplink resource the uplink synchronization signal.

In yet another exemplary embodiment of the invention there is an apparatus which includes means for transmitting to a user equipment an assignment of an uplink resource on which to send an uplink synchronization signal, means for receiving from the user equipment on the assigned uplink resource the uplink synchronization signal, and means for determining from the uplink synchronization signal a timing advance for the user equipment.

Further, in the exemplary embodiment of the invention above the means for transmitting comprises a transmitter, the means for receiving comprises a receiver, and the means for determining comprises a processor.

DESCRIPTION OF THE DRAWINGS

The foregoing and other aspects of embodiments of this invention are made more evident in the following Detailed Description when read in conjunction with the attached Drawing Figures.

FIG. 3A illustrates operation of a method in accordance with the exemplary embodiments of this invention, while FIG. 3B shows a conventional approach.

FIG. 5 illustrates a logic flow diagram that is descriptive of a method and an operation of a network device for implementing the exemplary embodiments of this invention.

FIG. 6 illustrates a logic flow diagram that is descriptive of a method and an operation of a user equipment for implementing the exemplary embodiments of this invention.

DETAILED DESCRIPTION

The exemplary embodiments of this invention relate to and are described below in the context of UTRAN-LTE. More specifically, the exemplary embodiments of this invention address the area of UE UL synchronization, and an ability for the network to estimate the UL synchronization for the UE. However, it should be appreciated that at least some aspects of the exemplary embodiments are applicable to other types of wireless communication systems such as GSM, HSPDA, or any packet-switched system.

Figure 1:
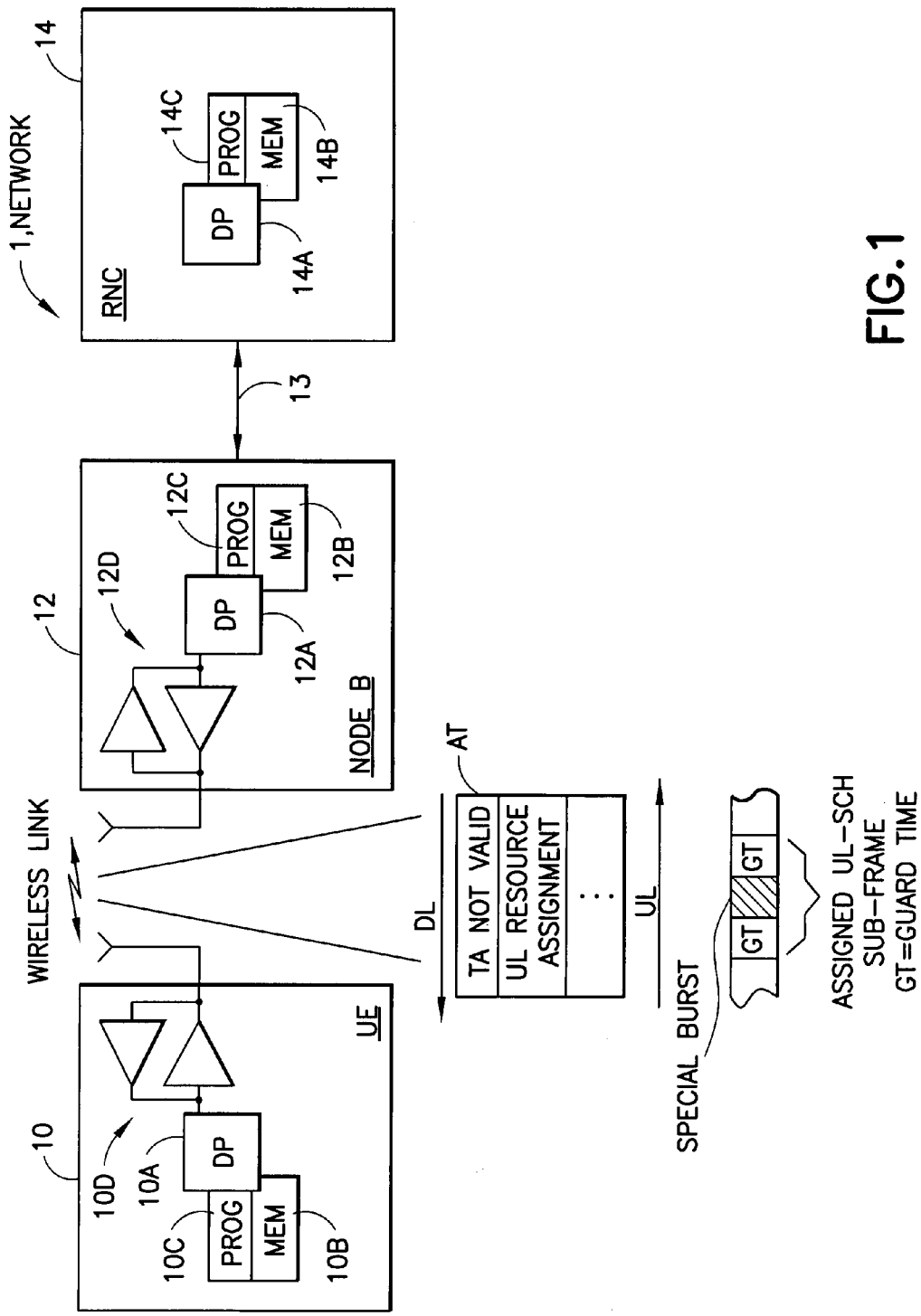
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12, also referred to herein as an eNodeB. The network 1 may include a RNC 14, or other radio controller function, which may be referred to as a mobility management entity MME or gateway (see 3GPP TS 36.300 V1.0.0). The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the RNC 14 that also includes a DP 14A and a MEM 14B storing an associated PROG 14C.

As will be described below, at least the PROGs 10C and 12C include program instructions that, when executed by the associated DP, enable the electronic device to operate in accordance with the exemplary embodiments of this invention. For example, the PROG 12C includes program instructions that direct the Node B 12 to signal the UE 10, such as in a data structure sent as an AT, for assigning to the UE 10 a dedicated uplink resource (e.g., an UL-SCH sub-frame) in which to transmit a special synchronization burst to be used by the Node B 12 for calculating a TA value, as well as to receive the special burst from the assigned UL resource for use in calculating the TA value. The PROG 10C includes program instructions that direct the UE 10 to transmit the special burst in the assigned UL resource.

Figure 2:
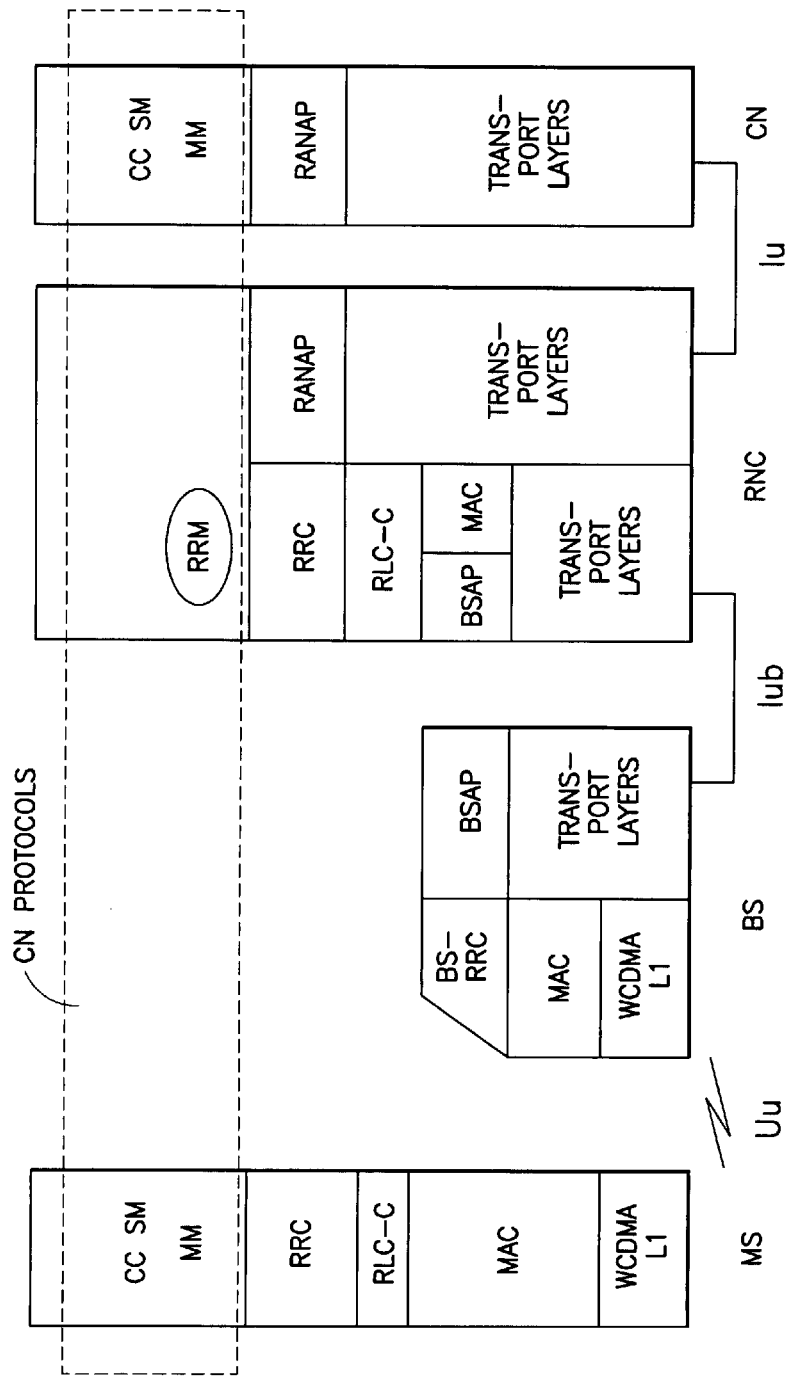
FIG. 2 illustrates the protocol stacks of an UMTS packet data service for control signaling and transmission of user data.

Reference is now made to FIG. 2, where FIG. 2 shows the protocol stack used for control signaling between the mobile station MS and the core network CN. Mobility management MM, call control CC and session management SM of the mobile station MS are signaled on the highest protocol layers between the mobile station MS and the core network CN in such a manner that the base stations BS and the radio network controller RNC located in between are transparent to this signaling. The radio resources management of radio links between mobile stations MS and base stations BS is carried out by a radio resource management system RRM which transmits control data from the radio network controller RNC to the base stations BS. These functions associated with the general management of a mobile system form a group called core network protocols (CN protocols), also known as Non-Access Stratum. Correspondingly, the signaling related to the radio network control between the mobile station MS, the base station BS and the radio network controller RNC is carried out on protocol layers called radio access network protocols (RAN protocols), i.e. Access Stratum. These include transfer protocols of the lowest level, whose control signaling is transferred to the higher levels for further processing. The most essential one of the higher Access Stratum layers is the radio resource control protocol RRC which is responsible for example for establishing, configuring, maintaining and releasing logical connections between the mobile station MS and the radio network UTRAN and for transmitting control information from the core network CN and the radio network RAN to the mobile stations MS. In addition, the radio resource control protocol RRC is responsible for allocating sufficient capacity according to the instructions of the radio resource management system RRM to a user terminal connection in an application-based capacity allocation, for example.

The exemplary embodiments of this invention may be implemented by computer software executable by the DP 10A of the UE 10 and the other DPs, such as in cooperation with a DP in the network, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Having thus introduced one suitable but non-limiting technical context for the practice of the exemplary embodiments of this invention, the exemplary embodiments will now be described with greater specificity.

The exemplary embodiments of this invention provide a method and apparatus for the network 1 to measure the UL TA for a certain UE 10 when UL data transfer is required. The method and apparatus may be applied to (but are not restricted to) a situation where the network 1 has knowledge beforehand that there will be a need for the UE 10 to transmit in the UL-SCH. This may be the case when the network 1 desires to request measurements of some sort from the UE 10, as well as when the network 1 expects that the UE has a need for sending positive or negative acknowledgments (ACK/NACK) in the UL in response to DL traffic.

In accordance with the exemplary embodiments of this invention a network-assigned UE 10 dedicated UL resource is provided for use by the UE 10 for sending a special burst. This burst is then used by the network 1 (for example, is used by the Node B 12) for measuring the TA of the UE 10. The burst is specifically designed to accommodate a large timing uncertainty, e.g., the burst type may resemble the burst used on the non-synchronous RACH in E-UTRAN, or may resemble the access burst type known from GSM that is used in, for example, handover and RACH.

The network 1 calculates the TA of the UE 10 based on the received special burst and thereafter informs the UE 10 of the new TA value in a following resource assignment message, or through other suitable control signaling means.

The ensuing description is made using the non-limiting example of the UE 10 in an E-UTRAN LTE-ACTIVE state, but not UL synchronized. It can be noted that the exemplary embodiments of this invention may be employed as well to the UE 10 in, for example, the E-UTRAN LTE-IDLE mode, and in other situations as well including but not limited to similar modes of other wireless systems noted by example above.

When the UE 10 is in the ACTIVE state it has already been assigned a unique ID by the network 1. In fact, all UE that are in the ACTIVE state in a given cell have been assigned a unique identifier. This means that the network 1 can uniquely address the UE 10. This may be done, for example, through the use of an AT sent on the DL. The unique address assigned to the UE 10 may be referred to as the RLID or as the C-RNTI, as two non-limiting examples.

When the UE 10 is in the LTE-ACTIVE state it may lose synchronization if it has not transmitted on the UL for some period of time, and further the network 1 has not had the opportunity to calculate and assign a new TA value. In this case the UE 10 should not be allowed to transmit a normal burst in the UL-SCH before a new and valid TA value has been received from network 1. The network 1 calculates the TA based on a special synchronization burst that the UE 10 sends in the UL.

As was noted above, it has been proposed that the synchronization is performed using the non-synchronized RACH channel procedure (see FIG. 3B transmission labeled 330)).

Figures 3A, 3B:
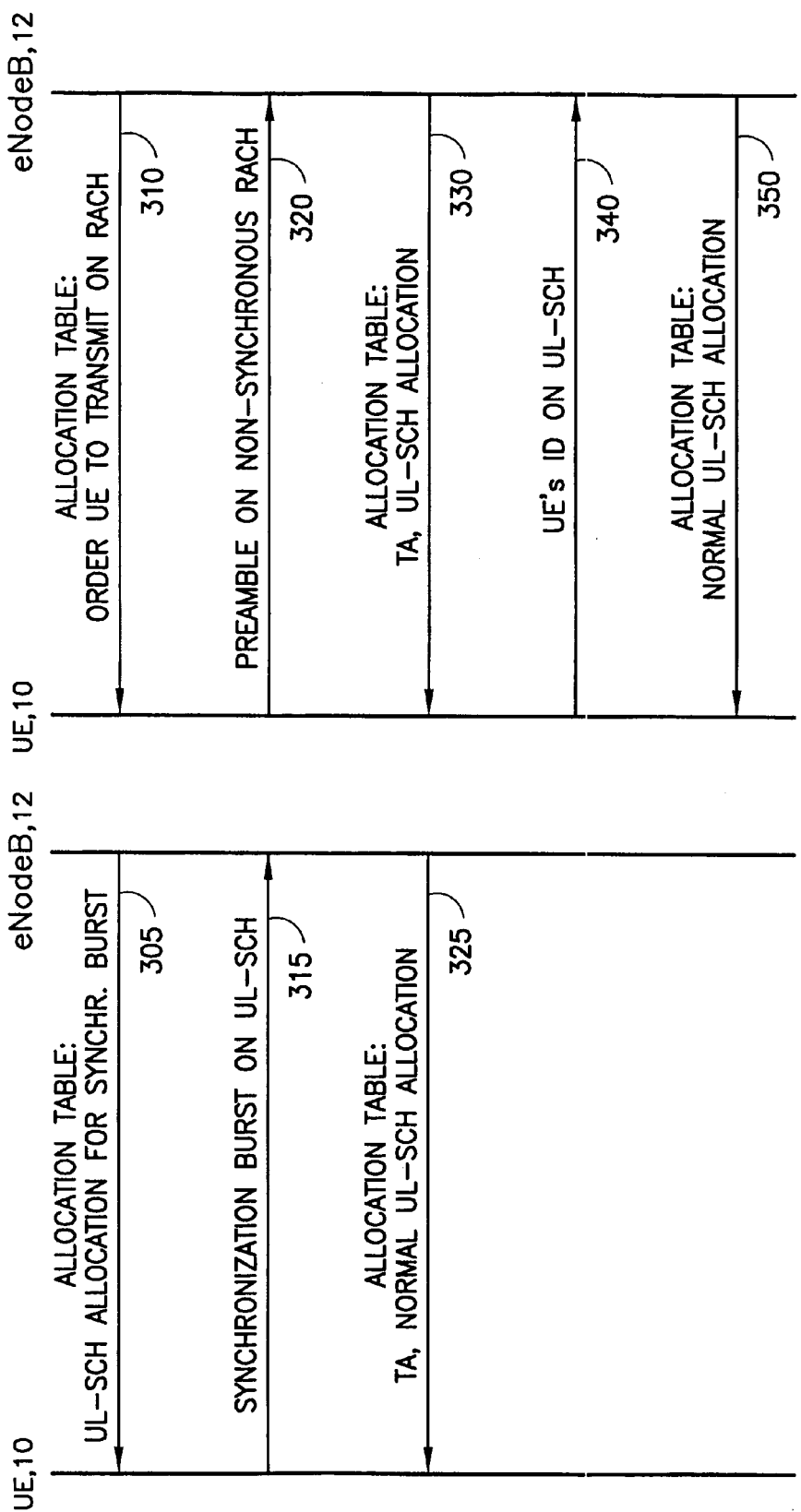

More specifically, in FIG. 3B the Node B, which may be referred to as an eNodeB, sends in an AT an order for the UE 10 to transmit on the RACH 310. The UE 10 responds at 320 by transmitting a preamble (the special synchronization burst) on the non-synchronized RACH. In response, the eNodeB computes the TA for the UE 10 and sends in an AT 330 the calculated TA and the UL-SCH allocation. At 340 the UE 10 sends a unique ID on the UL-SCH, and at 350 the eNodeB sends a normal UL-SCH allocation in an AT.

The exemplary embodiments of this invention instead provide for the special synchronization burst to be transmitted on an UL-SCH allocation assigned to the UE 10 by the network 1 (see FIG. 3A 315, and FIG. 4 440), and not on the RACH. That is, and referring to FIG. 1, the special synchronization burst is sent within an UL-SCH sub-frame that is assigned to the UE 10 by the Node-B in, for example, an AT. Note that a single AT/PDCCH may allocate more than one UE 10 to the same UL-SCH, which may be dedicated for the special synchronization bursts detailed herein. It is within the scope of this invention that two UEs 10 may be assigned in the same AT/PDCCH the same UL (shared) resource on which to transmit their individual uplink synchronization signals. In such a case of simultaneous UL synchronization bursts on the same shared channel, the eNode B 12 can distinguish the UEs from one another by use of a separate and unique preamble used by each of the UEs 10 on their uplink transmission of the special synchronization burst. In one embodiment such a unique preamble is signaled to each UE upon cell entry (or other control signalling) so that each UE is pre-allocated a unique preamble for use with the UL-SCH synchronization burst. In another embodiment the AT/PDCCH itself may include an additional field so as to make an association between a preamble and an UE's RLID or other UE identifier used in the AT/PDCCH. In this embodiment, when the UE recognizes that a preamble in that new field is associated with its identifier, it uses that preamble on the UL-SCH synchronization burst. In either manner, the preamble enables the eNode B to distinguish multiple UE's sending their own synchronization bursts at the same time on the same shared channel.

The special synchronization burst differs from the normal UL-SCH burst in the sense that a larger guard time (GT) is included to accommodate the unknown TA (and thus to avoid interfering with UL transmissions sent by other UEs 10). The guard time may be made equal to that used in the non-synchronous RACH transmission (FIG. 3B, 320). When the eNodeB 12 receives the special burst it calculates the TA of the UE 10 in a conventional manner, and assigns the TA to the UE 10 in the DL either through (as non-limiting examples): normal control signaling, as part of a header in a normal data transmission, or in a (next) AT.

In accordance with the exemplary aspects of this invention, and because the synchronization burst is sent on an UL resource dedicated to a specific UE 10, there can be no collisions with bursts sent by other UEs, as may occur when using the RACH.

As one non-limiting example, the synchronization burst may comprise a cell specific pilot code sequence.

Several different alternatives exist for the network 1 to indicate to the UE 10 that the purpose of the assigned UL resource is for TA measurement. In a first non-limiting example this may be indicated directly in an AT that no TA value is available (in a TA field), and that the UE 10 should therefore use the assigned UL-SCH resource for sending the synchronization burst transmission (see FIG. 1). In a second non-limiting example this may be indicated based on a TA value lifetime timer (a software and/or hardware timer) that runs in both the UE 10 and in the network 1 (or through the use of other time measurement alternatives such as, for example, the duration of DRX period(s) or frame numbers). If the TA validity timer is exceeded the UE 10 should use the assigned UL-SCH resource for transmission of the synchronization burst. In a third non-limiting example the AT/PDCCH or other resource allocation message can include a preamble associated with a UE's temporary identifier (either associated in the AT itself or signaled to the UE upon the UE's entry into the cell), where the presence of such a preamble in the AT indicates to the UE that it is to send a special synchronization burst on the resources allocated in that AT/PDCCH. The UE then sends that preamble itself on the uplink allocated resource as its synchronization burst (or in conjunction with some other information that serves as the burst). As above, the same AT/PDCCH can allocate multiple UEs 10 for sending a synchronization burst by using unique preambles sent in the same AT/PDCCH and associated with different UEs. Note that the preamble embodiment may be used to enable the e-Node B to distinguish among different UE's synchronization bursts even where the AT indicates that no TA value is available or where the lifetime timer has expired.

The timing advance is a signal derived from the time synchronization of the UL sequence and sent by the eNB 12 to the UE 10, which the UE 10 uses to advance its timings of transmissions to the eNB so as to compensate for propagation delay and thus time align the transmissions from different UEs with the receiver window of a eNB 12. By avoiding the overlapping of uplink transmissions, timing advance allows time domain multiplexing in the uplink.

The active mode or state noted above is sometimes referred to as an LTE-ACTIVE or RRC_CONNECTED state. In such a state, network controlled UE assisted handovers are performed. In this state, the timing advance may be permanently maintained or only temporarily maintained. If temporary, the MAC knows if layer 1 is synchronized and which procedure to use to start transmitting in the uplink. Cases where the UL synchronization status may move from "synchronized" to "non-synchronized" include an expiration of a timer; non-synchronized handover; or an explicit request by MAC or RRC in the eNB 12. Any of these may cause the eNB to send a resource allocation to the UE for the synchronization burst above and cause the UE to send it so as to become synchronized.

As can be appreciated, the RACH need not be utilized for achieving the UL UE synchronization, and thereby the procedure in accordance with the exemplary embodiments of this invention avoids collision risks and the uncertainty in the delay that are inherent in the use of the RACH-based synchronization procedure. Assuming that the UE 10 receives the ATs when requested it can also be seen that this procedure is a more efficient use of radio resources.

Figure 4:
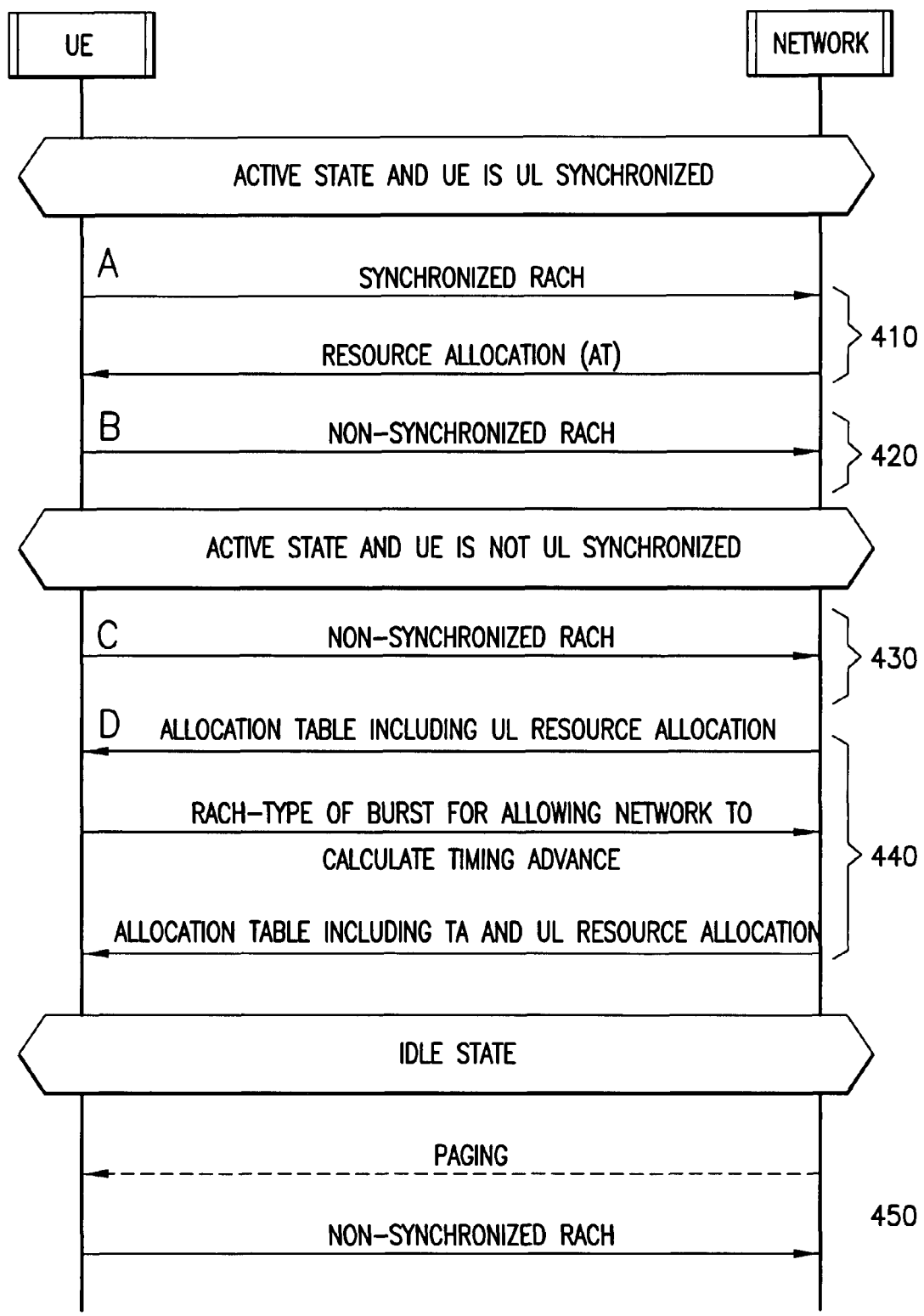
FIG. 4 illustrates currently known techniques for a network to acquire the TA of a UE, as well as a RACH procedure proposed for use in UTRAN-LTE, in addition to an UL synchronization procedure in accordance with an embodiment of this invention.

Referring to FIG. 4, the signaling sequence 410 refers to the conventional Active state when UE 10 is UL synchronized, and the UE 10 uses the synchronized RACH channel for requesting resources from the network 1.

The signal 420 is shown for completeness, but actually may be eliminated as the UE 10 already has UL synchronization. As such, the use of the non-synchronized RACH channel at this time would be a waste of resources.

The signal 430 shows the conventional procedure, when the UE 10 is not UL synchronized, that uses the non-synchronized RACH channel to initially access the network.

The signaling sequence 440 is in accordance with the exemplary embodiments of this invention (see also FIG. 3A), where the network 1 assigns via an AT a special UL resource to be used by the UE 10 for transmitting the UL access burst to be used by the network for TA estimation/calculation. The calculated TA is delivered to the UE in the DL, in this example, via an AT, although other control signaling procedures could be used as was noted above.

The signaling sequence 450 illustrates a conventional Idle mode procedure (network 1 initiated through paging and UE 10 initiated through the non-synchronized RACH channel procedure). However, as was noted above the exemplary embodiments of this invention may be applied as well to Idle mode UL synchronization.

There are a number of advantages that can be realized through the use of the exemplary embodiments of this invention. For example, the use of the exemplary embodiments of this invention reduces the load on the non-synchronized RACH channel and, therefore, saves radio resources as transmission on a scheduled resource is generally more efficient than transmission on a contention-based resource. As another example, setup delays due to possible RACH collisions can be reduced, as the possibility for a RACH collision to occur is eliminated. As another example, the use of the exemplary embodiments of this invention ensures an easy and controlled way for the network 1 to be able to acquire the UE TA value when the UL traffic needs are known.

Further, it can be appreciated that the use of the exemplary embodiments of this invention relaxes any restrictions that may be imposed on the length of DRX periods, as it simplifies and makes more efficient a subsequent UL re-synchronization of the UE 10 after a possibly lengthy DRX period.

Referring to FIG. 5, there is a method in accordance with an exemplary embodiment of the invention, wherein a network device is transmitting 501 to a user equipment an assignment of an uplink resource on which to send an uplink synchronization signal. This is followed by receiving 510 from the user equipment on the assigned uplink resource the uplink synchronization signal, and determining 520 from the uplink synchronization signal a current timing advance for the user equipment.

Referring to FIG. 6, there is a method of an exemplary embodiment of the invention, wherein a user equipment is receiving from a network device 601 an assignment of an unlink resource on which to send an uplink synchronization signal. Thereafter, the user transmits 610 the uplink synchronization signal on the assigned uplink resource.

As can be realized, the exemplary embodiments of this invention provide methods, apparatus and computer program products for use in performing UL synchronization of the UE 10 by assigning to the UE 10 an UL resource in which to transmit an UL synchronization signal, and to receive at the Node B 12 the synchronization signal from the assigned U L resource for use in determining a current TA value for use by the UE 10 in subsequent UL transmissions to the Node B 12. The UL resource is preferably one dedicated to the UE 10 so as to avoid a potential for interference with or from a transmission from another UE, and is preferably a non-contention based UL resource. Specific preambles pre-allocated to different UEs 10 can also be used to avoid collision among UEs sharing the same UL-SCH as detailed above, in that the synchronization burst itself includes the pre-amble which the e-NodeB recognizes as unique to a particular UE 10. The synchronization signal may be a synchronization burst comprised of, for example, a cell specific pilot code sequence or a preamble associated with a specific UE 10 (e.g., associated upon cell entry or in the AT/PDCCH/resource allocation message itself which allocates the uplink resource to send the synchronization burst).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, signal flow diagrams, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. For example, while the exemplary embodiments of the invention have been described above in the context of the UTRAN and E-UTRAN systems, it should be appreciated that the exemplary embodiments of this invention can be applied as well to other types of wireless communications systems, methods and schemes. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method, comprising:
  transmitting to a user equipment a physical downlink control channel message containing a synchronization signal associated with the user equipment and containing an assignment of an uplink resource on which to send the synchronization signal;
  receiving from the user equipment on the assigned uplink resource the synchronization signal; and
  determining a timing advance for the user equipment based at least in part on the synchronization signal.

2. The method of claim 1, where the assigned uplink resource is a shared channel uplink resource.

3. The method of claim 1, further comprising sending the determined timing advance to the user equipment.

4. The method of claim 3, wherein the timing advance is sent using either control signaling; a header in a data transmission; or an allocation table.

5. The method of claim 1, wherein the said user equipment comprises a first user equipment, said synchronization signal comprises a first synchronization signal, and said timing advance comprises a first timing advance;
  wherein transmitting comprises transmitting to the first user equipment and to a second user equipment a first allocation table comprising the assignment of the uplink resource;
  wherein receiving comprises receiving from the first user equipment on the uplink resource the first synchronization signal and receiving from the second user equipment on the uplink resource a second synchronization signal; and wherein determining comprises determining from the first synchronization signal the first timing advance for the first user equipment and determining from the second synchronization signal of the second user equipment a second timing advance for the second user equipment; the method further comprising:

sending to the first and second user equipment the first and second timing advance in a second allocation table.

6. The method of claim 1, where the assignment of the uplink resource is transmitted to the user equipment in an allocation table.

7. The method in claim 1, where the synchronisation signal received from the user equipment comprises a guard time equal to a guard time in a transmission over a non-synchronous random access channel.

8. The method of claim 1, wherein the assignment of the uplink resource further comprises an indication that no timing advance value is available.

9. The method of claim 1, executed in response to the user equipment becoming established in a cell by a non-synchronized handover.

10. The method of claim 1 where the synchronization signal associated with the user equipment comprises a preamble associated with the user equipment.

11. A method, comprising:

receiving at a user equipment from a network device a physical downlink control channel message containing a synchronization signal associated with the user equipment and containing an assignment of an uplink resource on which to send the synchronization signal; and transmitting by the user equipment on the assigned uplink resource the synchronization signal.

12. The method of claim 11, where the assigned uplink resource is a shared channel uplink resource.

13. The method of claim 11, further comprising after transmitting, receiving a timing advance and synchronizing a further transmission to the timing advance.

14. The method of claim 13, wherein the timing advance is received in one of control signaling; a data transmission; and an allocation table.

15. The method in claim 11, where the transmitted synchronization signal comprises a guard time equal to a guard time in a transmission over a non-synchronous random access channel.

16. The method of claim 11, wherein the assignment of the uplink resource further comprises an indication that no timing advance value is available.

17. The method of claim 11, wherein transmitting is conditional on expiration of a timing advance timer.

18. The method of claim 11 where the synchronization signal associated with the user equipment comprises a preamble associated with the user equipment.

19. A computer readable non-transitory memory tangibly encoded with a computer program executable by a processor to perform operations, comprising:

transmitting to a user equipment a physical downlink control channel message containing a synchronization signal associated with the user equipment and containing an assignment of an uplink resource on which to send the synchronization signal;

receiving from the user equipment on the assigned uplink resource the synchronization signal; and determining a timing advance for the user equipment based at least in part on the synchronization signal.

20. The computer readable non-transitory memory of claim 19, where the assigned uplink resource is a shared channel uplink resource.

21. The computer readable non-transitory memory of claim 19, further comprising sending the determined timing advance to the user equipment.

22. The computer readable non-transitory memory of claim 21, where the timing advance is sent using either control signaling; a header in a data transmission; or an allocation table.

23. The computer readable non-transitory memory of claim 19, where the assignment of the uplink resource is transmitted to the user equipment in an allocation table.

24. The computer readable non-transitory memory of claim 19, where the synchronization signal received from the user equipment comprises a guard time equal to a guard time in a transmission over a non-synchronous random access channel.

25. The computer readable non-transitory memory of claim 19, wherein the assignment of the uplink resource further comprises an indication that no timing advance value is available.

26. The computer readable non-transitory memory of claim 19, executed in response to the user equipment becoming established in a cell by a non-synchronized handover.

27. The computer readable non-transitory memory of claim 19 where the synchronization signal associated with the user equipment comprises a preamble associated with the user equipment.

28. An apparatus, comprising at least one processor; and at least one memory including computer program code, the at least one non-transitory memory and the computer program code configured to, with the at least one processor, cause the apparatus to perform at least the following:

to transmit to a user equipment a physical downlink control channel message containing a synchronization signal associated with the user equipment and containing an assignment of an uplink resource on which to send the synchronization signal;

to receive from the user equipment on the assigned uplink resource the synchronization signal; and to determine a timing advance for the user equipment based at least in part on the synchronization signal.

29. The apparatus of claim 28, where the assigned uplink resource transmitted to the user equipment is a shared channel uplink resource.

30. The apparatus of claim 28, where the at least one memory and the computer program code are further configured to cause the apparatus to transmit the timing advance to the user equipment.

31. The apparatus of claim 28 comprising a Node B.

32. The apparatus of claim 28 where the synchronization signal associated with the user equipment comprises a preamble associated with the user equipment.

33. An apparatus comprising at least one processor; and at least one non-transitory memory including computer program code, the at least one memory and the computer program code configured to, with the at least one processor, cause the apparatus to perform at least the following:

to receive at a user equipment from a network device a physical downlink control channel message containing a synchronization signal associated with the user equipment and containing an assignment of an uplink resource on which to send the synchronization signal; and to transmit by the user equipment on the uplink resource the synchronization signal.

34. The apparatus of claim 33, where the at least one memory and the computer program code are further configured to cause the apparatus, after transmitting the synchronization signal, to receive a timing advance and to synchronize a further transmission to the timing advance.

35. The apparatus of claim 33, wherein the at least one memory and the computer program code are further configured to cause the apparatus, to transmit the synchronization signal conditional on expiration of a timing advance timer.

36. The apparatus of claim 33 where the synchronization signal associated with the user equipment comprises a preamble associated with the user equipment.

* * * * *